(12) United States Patent
Miwa et al.

(10) Patent No.: US 7,695,798 B2
(45) Date of Patent: Apr. 13, 2010

(54) HONEYCOMB STRUCTURE AND HONEYCOMB CATALYST

(75) Inventors: Shinichi Miwa, Brussels (BE); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/109,995

(22) Filed: Apr. 25, 2008

(65) Prior Publication Data

US 2008/0220205 A1    Sep. 11, 2008

Related U.S. Application Data

(63) Continuation of application No. PCT/JP2006/320873, filed on Oct. 19, 2006.

(30) Foreign Application Priority Data

Nov. 4, 2005    (JP)    ............... 2005-320832

(51) Int. Cl.
    *B32B 3/12*    (2006.01)
(52) U.S. Cl. ............... 428/117; 428/116; 502/439
(58) Field of Classification Search ............ 502/439; 428/116, 117
    See application file for complete search history.

(56) References Cited

U.S. PATENT DOCUMENTS

| | | | |
|---|---|---|---|
| 6,818,580 B2 | 11/2004 | Kumazawa et al. | |
| 7,297,175 B2 | 11/2007 | Miwa | |
| 2002/0132720 A1* | 9/2002 | Cutler et al. | 501/103 |
| 2004/0131772 A1* | 7/2004 | Yamada et al. | 427/230 |
| 2004/0166035 A1 | 8/2004 | Noda et al. | |
| 2005/0050845 A1* | 3/2005 | Masukawa et al. | 52/782.1 |

FOREIGN PATENT DOCUMENTS

| | | |
|---|---|---|
| JP | A 2000-042420 | 2/2000 |
| JP | A 2003-033664 | 2/2003 |
| JP | A 2003-040687 | 2/2003 |
| JP | A 2003-205246 | 7/2003 |
| JP | A 2003-269132 | 9/2003 |
| JP | A 2004-132193 | 4/2004 |
| JP | A 2004-162544 | 6/2004 |

* cited by examiner

*Primary Examiner*—Timothy C Vanoy
*Assistant Examiner*—Daniel Berns
(74) *Attorney, Agent, or Firm*—Oliff & Berridge, PLC

(57) ABSTRACT

A honeycomb structure 1 for a catalyst carrier including partition walls 4 arranged so as to form a plurality of cells 3 which connect two end faces 2a, 2b, the partition walls 4 being porous and having a large number of pores; the structure further including plugging portions 10 arranged so as to alternately plug one of the end portions of each of the cells 3 in the two end faces 2a, 2b. A geometrical surface area (GSA: a value ((S1+S2)/V) obtained by dividing a total of the whole inner surface area (S1) excluding the cell pores and the whole inner surface area (S2) of the pores by the whole volume (V) of the honeycomb structure) is 80) cm2/cm3 or more and less than 300 cm2/cm3.

18 Claims, 7 Drawing Sheets

FIG.6(b)

ably constructed in view of the conventional technology, and an objective thereof is to provide a honeycomb structure applicable to a honeycomb catalyst having an excellent purification efficiency and a small pressure loss and mountable even in a limited space, and a honeycomb catalyst having an excellent purification efficiency and a small pressure loss and mountable even in a limited space.

HONEYCOMB STRUCTURE AND HONEYCOMB CATALYST

This is a Continuation of International Application No. PCT/JP2006/320873 filed Oct. 19, 2006, which claims the benefit of Japanese Patent Application No. 2005-320832 filed Nov. 4, 2005. The disclosure of the prior applications is hereby incorporated by reference herein in its entirety.

TECHNICAL FIELD

The present invention relates to a honeycomb structure and a honeycomb catalyst preferable for use in purifying components to be purified contained in exhaust gas discharged from stationary engines for an automobile, a construction machine and industry, a combustion apparatus and the like, for example, components such as carbon monoxide (CO), hydrocarbon (HC), nitrogen oxide ($NO_x$) and sulfur oxide ($SO_x$).

BACKGROUND ART

At present, a honeycomb catalyst where a catalyst is carried on a honeycomb structure is used in purifying exhaust gas discharged from various kinds of engines. As shown in FIG. 7, this honeycomb catalyst has a structure in which a catalyst layer 15 is carried on the surface of partition walls 4 forming cells 3. Moreover, as shown in FIGS. 8, 9, to purify the exhaust gas by the use of a honeycomb catalyst 60 (a honeycomb structure 11), the exhaust gas is allowed to flow into the cells 3 of the honeycomb catalyst 60 from one end face 2a side, brought into contact with catalyst layers (not shown) on the surfaces of partition walls 4, and discharged from the other end face 2b side (e.g., see Patent Document 1).

In the case of purifying the exhaust gas by the use of such a honeycomb catalyst, conveyance of components to be purified contained in the exhaust gas from the exhaust gas to the catalyst layer on the surfaces of the partition walls needs to be promoted as much as possible to improve a purification efficiency. To improve the purification efficiency of the exhaust gas, reduction of a hydraulic diameter of the cells, enlargement of a surface area of the partition walls and the like are necessary. Specifically, a method for increasing the number of cells per unit area (a cell density) and the like are employed.

Here, it is known that a conveyance ratio of the components to be purified from the exhaust gas to the catalyst layer on the surfaces of the partition walls increases in inverse proportion to a square of the hydraulic diameter of the cell. Therefore, when the cell density is increased, the conveyance ratio of the components to be purified improves. However, pressure loss tends to increase in inverse proportion to the square of the hydraulic diameter. Therefore, there is a problem that with the increase of the conveyance ratio of the components to be purified, the pressure loss increases.

It is to be noted that the catalyst layer on the surfaces of the partition walls usually has a thickness of about several tens μm. Here, in a case where the components to be purified are diffused in the catalyst layer at an insufficient rate, the purification efficiency of the honeycomb catalyst tends to lower. This tendency is remarkable especially on low temperature conditions. Therefore, to increase the purification efficiency of the exhaust gas, in addition to the enlargement of the surface area of the catalyst layer, the thickness of the catalyst layer needs to be reduced to increase the diffusion rate of the components to be purified in the catalyst layer. Therefore, though there is an advantage that the increase of the cell density results in the enlargement of the surface area of the catalyst layer, there is still a problem that the pressure loss increases.

To reduce the pressure loss while increasing the purification efficiency of the exhaust gas, an inflow diameter of the honeycomb catalyst needs to increased, and a flow rate of the exhaust gas to be circulated needs to be lowered. However, when the honeycomb catalyst is enlarged, a mounting space for the honeycomb catalyst to be mounted on a vehicle or the like is limited, and it is sometimes difficult to mount the catalyst.

Patent Document 1: JP-A-2003-33664

DISCLOSURE OF THE INVENTION

The present invention has been developed in view of the above-mentioned problem of the conventional technology, and an objective thereof is to provide a honeycomb structure applicable to a honeycomb catalyst having an excellent purification efficiency and a small pressure loss and mountable even in a limited space, and a honeycomb catalyst having an excellent purification efficiency and a small pressure loss and mountable even in a limited space.

To achieve the above objective, according to the present invention, there are provided the following honeycomb structure and honeycomb catalyst.

[1] A honeycomb structure for a catalyst carrier comprising: porous partition walls having a large number of pores and arranged so as to form a plurality of cells which connect two end faces to each other; and plugging portions arranged so as to alternately plug one of the end portions of each of the cells in the two end faces, wherein a geometrical surface area (GSA: a value ((S1+S2)/V) obtained by dividing a total of the whole inner surface area (S1) excluding the pores of the cells and the whole inner surface area (S2) of the pores by the whole volume (V) of the honeycomb structure) is 80 $cm^2/cm^3$ or more and less than 300 $cm^2/cm^3$.

[2] The honeycomb structure according to the above [1], wherein a part of the partition walls has a first missing portion (an inner cut) in the end faces and/or an inner part, and/or a part of the partition walls has a second missing portion (a rib cut) in the inner part.

[3] The honeycomb structure according to the above [1] or [2], wherein the plugging portions have a size in excess of a size five times an average value (an image maximum distance average) of inner diameters of the pores and have gaps extending through the plugging portions.

[4] The honeycomb structure according to any one of the above [1] to [3], wherein tips of the plugging portions in the two end faces have inwardly recessed dents.

[5] The honeycomb structure according to any one of the above [1] to [4], wherein a standard deviation of a distribution (a pore diameter distribution) of the inner diameters of the pores of the partition walls is 6% or more of a value of the image maximum distance average.

[6] The honeycomb structure according to any one of the above [1] to [5], wherein a ratio of the cells having a cell deformation degree (a difference (W−d) between a width (W) of the cell and a maximum dimension (d) of a predetermined cell gauge passable through the cell) of 0.05 mm or more among the plurality of cells is 10% or more.

[7] The honeycomb structure according to any one of the above [1] to [6], wherein a ten-point average surface roughness of the inner surfaces of the pores of the partition walls is 5 μm or more.

[8] The honeycomb structure according to any one of the above [1] to [7], wherein a distribution density of the plurality of cells per unit volume is in a range of 7 to 65 $cells/cm^2$, the partition walls have a thickness of 0.3 to 1 mm, the image maximum distance average is in a range of 50 to 500 μm, and a porosity is in a range of 40 to 65%.

[9] The honeycomb structure according to any one of the above [1] to [8], wherein the partition walls have a permeability of $7 \times 10^{-12}$ to $4 \times 10^{-8}$ m².

[10] A honeycomb catalyst wherein a catalyst is carried on the honeycomb structure according to any one of the above [1] to [9].

According to the present invention, there are provided a honeycomb structure applicable to a honeycomb catalyst having an excellent purification efficiency and a small pressure loss and mountable even in a limited space, and a honeycomb catalyst having an excellent purification efficiency and a small pressure loss and mountable even in a limited space.

BRIEF DESCRIPTION OF THE DRAWINGS

FIG. 6 are explanatory views schematically showing a relation between a maximum dimension (d) of a cell gauge and a width (W) of a cell in one embodiment of the honeycomb catalyst of the present invention, FIG. 6(b) shows the state that the cell gauge is applied to the cell, FIGS. 6(a), 6(b), 6(c) and 6(d) are partially enlarged views schematically showing examples of the gaps and schematically showing one embodiment of a honeycomb catalyst of the present invention.

Figure 1:
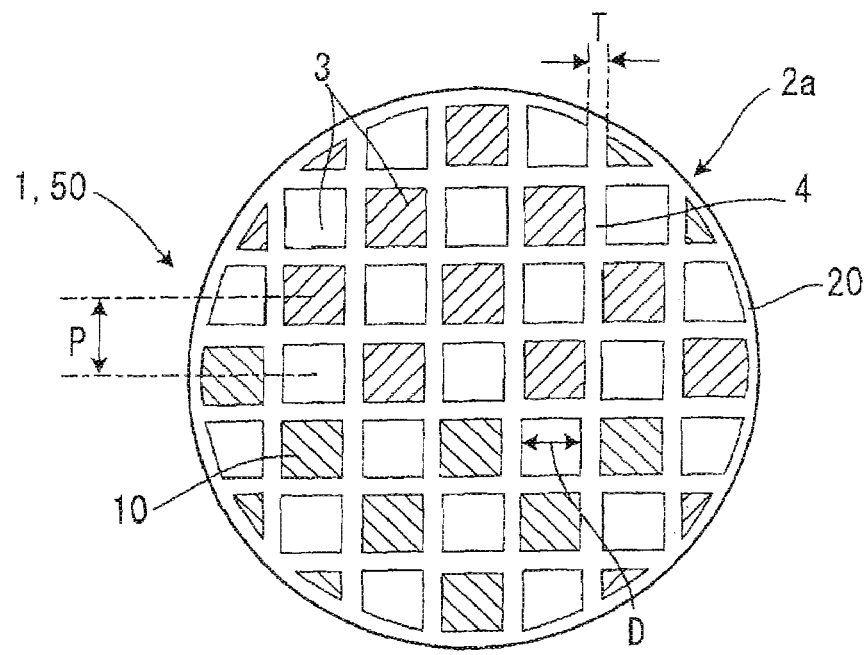
FIG. 1 is a front view schematically showing one embodiment of a honeycomb structure and a honeycomb catalyst of the present invention.

DESCRIPTION OF REFERENCE NUMERALS 1, 11, 21, 31, 41: honeycomb structure, 2a, 2b end face, 3: cell, 4, 72: partition wall, 5, 15: catalyst layer, 6: inner cut, 7: rib cut, 8: gap, 9: dent, 10': plugging portion, 20: outer wall, 25: pore, 35: catalyst layer carrying pore, 50, 60: honeycomb catalyst, 71: opening, 73: observation region (vision), G: cell gauge, d: maximum dimension of cell gauge, D: cell hydraulic diameter, H: rib remaining height, P: cell pitch, T, t: partition wall thickness, Hd: length of one side of an opening, and p: total length.

BEST MODE FOR CARRYING OUT THE INVENTION

Figure 2:
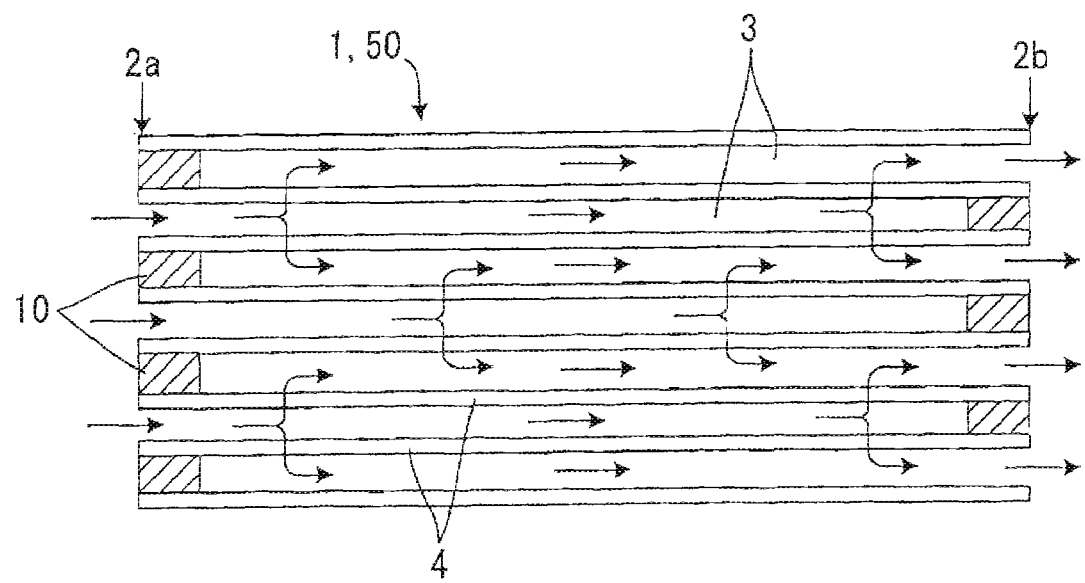
FIG. 2 is a sectional view schematically showing one embodiment of a honeycomb structure and a honeycomb catalyst of the present invention.

The best mode for carrying out the present invention will hereinafter specifically be described with reference to the drawings. FIG. 1 is a front view schematically showing one embodiment of a honeycomb structure and a honeycomb catalyst according to the present invention. FIG. 2 is a sectional view schematically showing one embodiment of a honeycomb structure and a honeycomb catalyst of the present invention. As shown in FIGS. 1, 2, the honeycomb structure of the present embodiment is a honeycomb structure 1 for carrying a catalyst including porous partition walls 4 having a large number of pores 25 (see FIG. 3) and arranged so as to form a plurality of cells 3 which connect two end faces 2a, 2b to each other; and plugging portions 10 arranged so as to alternately plug one of the end portions of each of the cells 3 in the two end faces 2a, 2b, characterized in that a geometrical surface area (GSA: a value ((S1+S2)/V) obtained by dividing a total of the whole inner surface area (S1) excluding the cell pores and the whole inner surface area (S2) of the pores by the whole volume (V) of the honeycomb structure) is 80 cm²/cm³ or more and less than 300 cm²/cm³. It is to be noted that, in FIG. 1, reference numeral 20 denotes an outer wall, P denotes a cell pitch, D denotes a cell hydraulic diameter, and T denotes a partition wall thickness.

Figure 10:
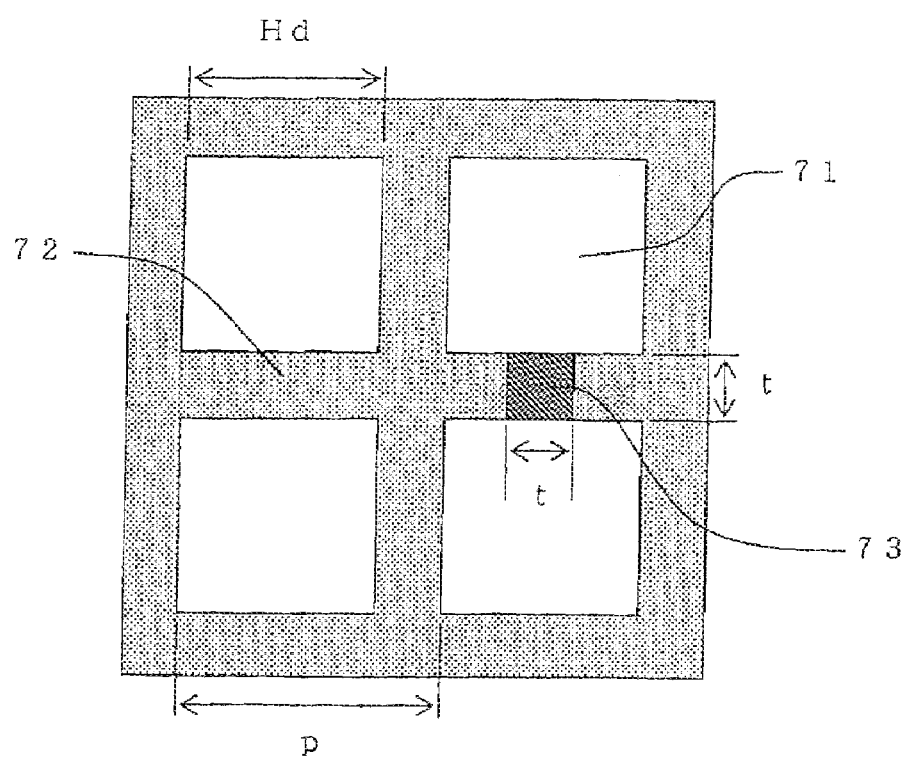
FIG. 10 is a plan view schematically showing a part of a section perpendicular to the central axis of an embodiment of a honeycomb structure of the present invention.

As described above, the geometrical surface area (GSA) is 80 cm²/cm³ or more and less than 300 cm²/cm³, preferably 120 cm²/cm³ or more and less than 300 cm² cm³. When the area is less than 80 cm²/cm³, an amount of substances of gas components to be conveyed to a catalyst runs short, and purification performance becomes insufficient. When the area is 300 cm²/cm³ or more, the catalyst easily thermally deteriorates during an exhaust gas treatment to lower the purification performance. Here, with regard to a relation (specifically relations S1/V and S2/V) among the whole inner surface area (S1) excluding the cell pores, the whole inner surface area (S2) of the pores, and the whole volume (V) of the honeycomb structure, S1/V can easily be obtained by measuring dimensions of the cell pitch P and the partition wall thickness t, and performing simple calculation from a geometrical relation as in $S1/V = 4(p-t)/p^2$ in the case of, for example, a quadrangular cell. Moreover, S2/V (cm²/cm³) can be calculated from the equation $S2/V = 60\epsilon(1-OFA)/Dp$, in which Dp (mm) is an average pore diameter obtained by a mercury porosimeter, OFA is an open frontal area of the honeycomb structure, and $\epsilon$ is a porosity of the honeycomb structure. As the mercury porosimeter, trade name: Auto Pore III model 9405 manufactured by Micromeritics Co. or the like may be used. The OFA is a ratio of an opening in a section perpendicular to the central axis of the honeycomb structure to the whole section. For example, as shown in FIG. 10, in a case where an opening 71 in the section perpendicular to the central axis of the honeycomb structure has a square shape, the OFA can be calculated from an equation $OFA = Hd^2/p^2$, in which Hd is a length or one side of the opening 71, and p (a total length) is a total of the length of one side of the opening 71 and a thickness of a partition wall 72. Thus, the geometrical surface area (GSA) can be obtained from a relation of $GSA = S1/V + S2/V = (S1+S2)/V$.

Figure 4A:
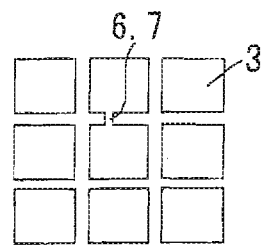
FIGS. 4(a), (b) and (c) are explanatory views schematically showing examples of an inner cut and a rib cut in one embodiment of a honeycomb catalyst of the present invention.
Figure 4B:
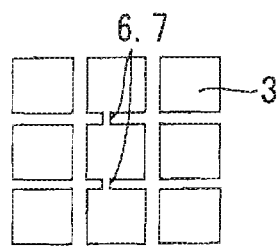
Figure 4C:
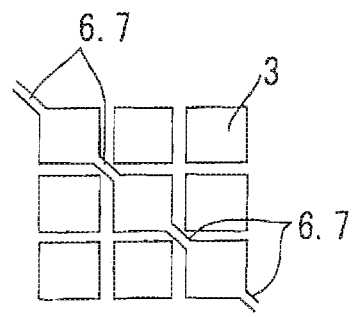
Figure 5A:
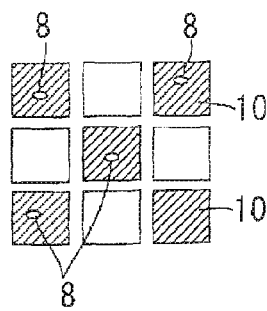
FIGS. 5(a), (b), (c) and (d) are explanatory views schematically showing examples of gaps in one embodiment of a honeycomb catalyst of the present invention.
Figure 5B:
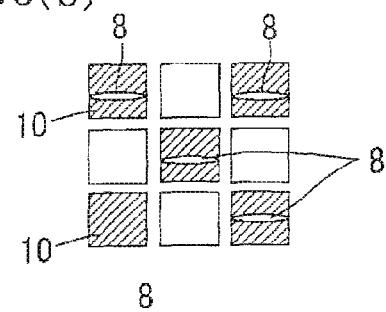
Figure 5C:
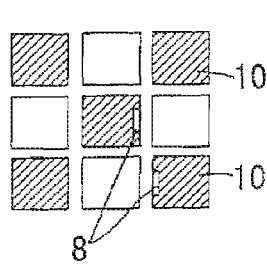
Figure 5D:
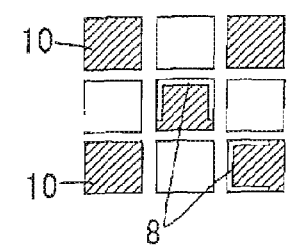
Figure 6A:
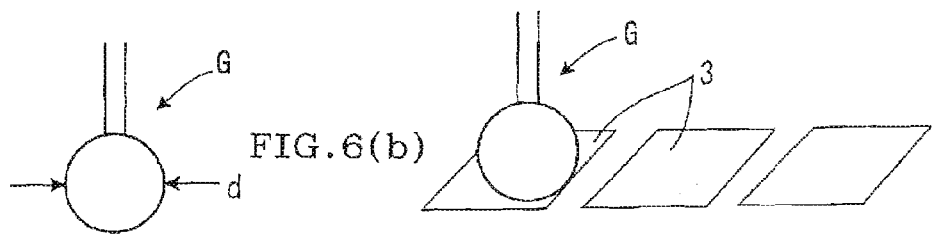
FIG. 6(a) shows a shape of the cell gauge.
Figure 6C:
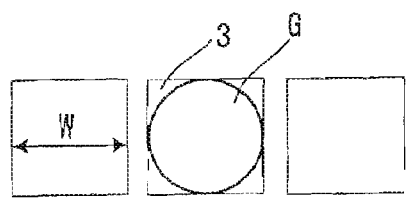
FIG. 6(c) shows the state that the cell gauge passes through the normal (not deformed) cell.
Figure 6D:
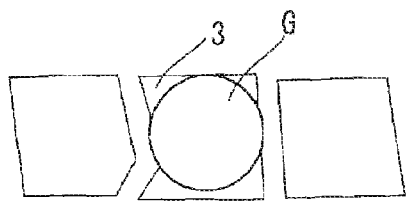
FIG. 6(d) shows the state that the cell gauge cannot pass through a deformed cell.

As shown in FIGS. 4(a) to (c), in the present embodiment, it is preferable that a part of the partition walls 4 has a first missing portion (an inner cut) 6 in the end faces and/or the inner part, and/or a part of the partition walls 4 has a second missing portion (a rib cut) 7 in the inner part. Here, the "rib cut" is a state in which a part of the partition walls 4 or an intersection where the partition walls intersect with each other is cut and in which such a cut can be observed in the end faces 2a, 2b. The "inner cut" has a configuration in which a similar cut is not observed in the end faces 2a, 2b, and is present only in the inner part.

According to such a constitution, a thermal stress due to a rapid temperature change can be relaxed, and a thermal shock resistance can be improved.

In the present embodiment, it is preferable that the plugging portions 10 have a size in excess of a size five times an average value (an image maximum distance average) of inner diameters of the pores 25 and have gaps 8 extending through the plugging portions 20. FIGS. 5(a) to (d) show examples of the gaps 8.

It is to be noted that the "gaps" are holes or cracks of the plugging portions 20 or gaps between the plugging portions 20 and the partition walls 4 which extend through the plugging portions 20 with the size in excess of the size five times the image maximum distance average of a material for the plugging portions 20, the size being any of vertical, lateral and width dimensions, in a case where the plugging portions 20 are observed in a direction perpendicular to the end faces 2a, 2b.

Figure 7:
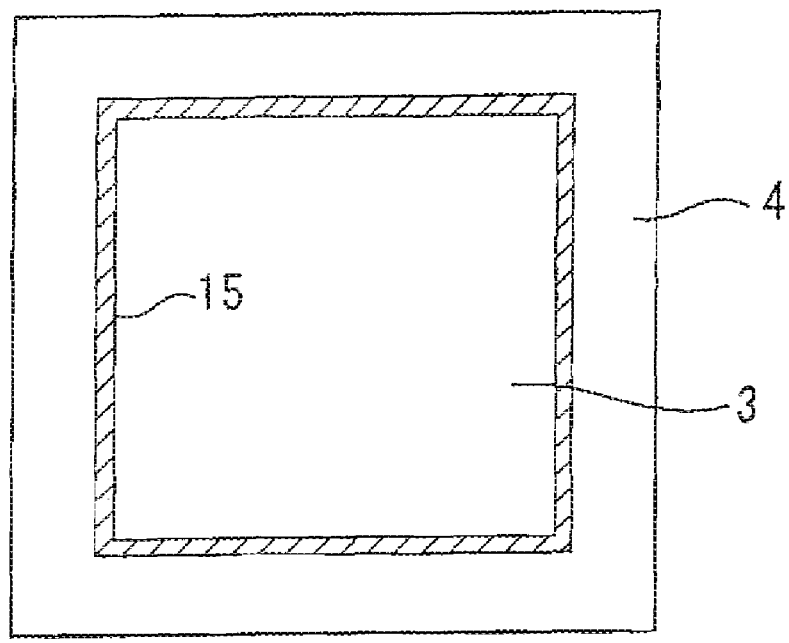
FIG. 7 is a partially enlarged view schematically showing one example of a conventional honeycomb catalyst.
Figure 8:
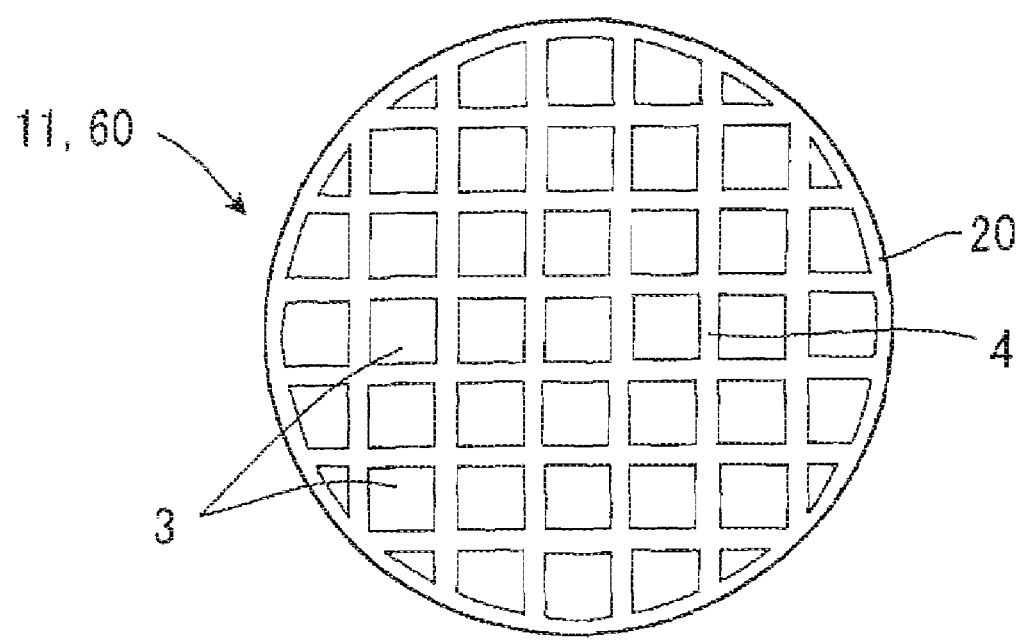
FIG. 8 is a front view schematically showing one example of a conventional honeycomb structure and a conventional honeycomb catalyst.
Figure 9:
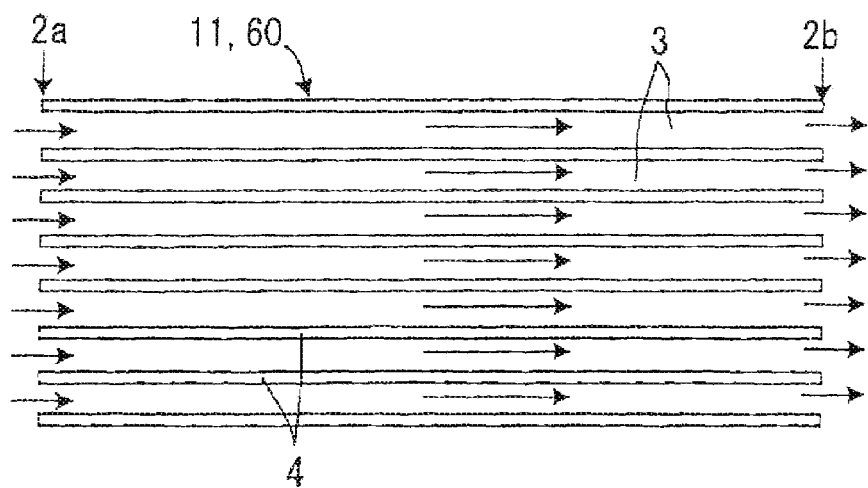
FIG. 9 is a sectional view schematically showing one example of a conventional honeycomb structure and a conventional honeycomb catalyst.
Figure 11:
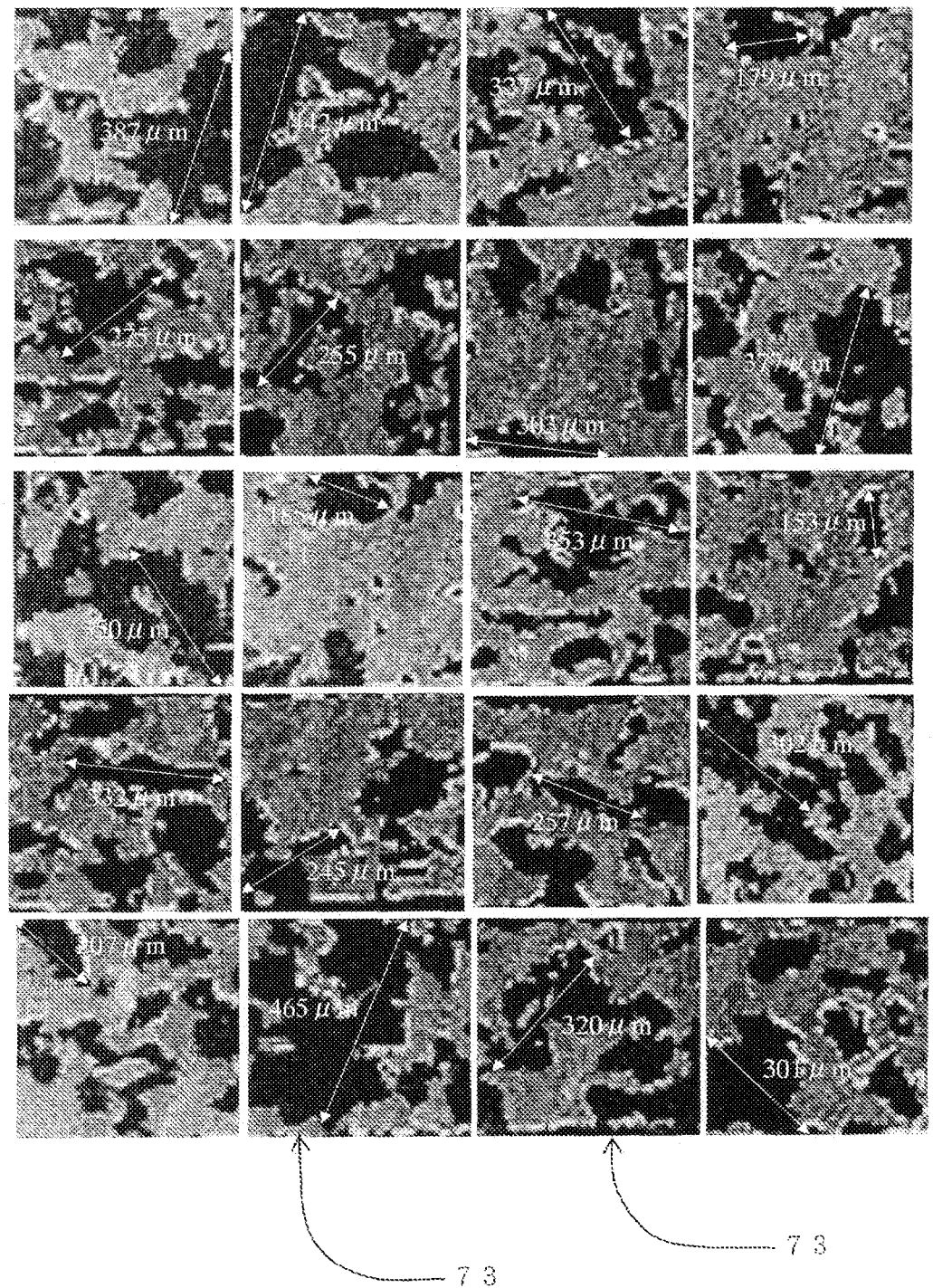
FIG. 11 is an SEM photograph of an embodiment of a honeycomb structure of the present invention.

Moreover, the "pore diameter" means a physical value measured by image analysis. Specifically, in an SEM photographs of a partition wall section at least 20 visions are observed, each vision having a size of vertical×lateral=t×t, in which "t" is the partition wall thickness. For example, in a plan view shown in FIG. 10 in which a part of the section perpendicular to the central axis of the honeycombs structure is enlarged, a region of t×t of the partition wall 72 is regarded as one observation region (vision) 73, and SEM photographs of 20 visions 73 are taken. Subsequently, a maximum linear distance in each void is measured in each observed vision, and an average of the maximum linear distances measured in each of the visions is the "image maximum distance average". For example, as shown in FIG. 11, in SEM photographs of 20 visions, the maximum linear distances of the respective visions are measured, and an average value is obtained. In the SEM photographs of 20 visions shown in FIG. 7, successively from the SEM photograph of a left end to that of a right end of stages from an uppermost stage to a lowermost stage, the maximum linear distances of the visions are 387 µm, 442 µm, 327 µm, 179 µm, 275 µm, 255 µm, 303 µm, 377 µm, 350 µm, 185 µm, 353 µm, 153 µm, 332 µm, 245 µm, 257 µm, 302 µm, 207 µm, 465 µm, 320 µm and 301 µm. In this case, the image maximum distance average is 301 µm. It is to be noted that the SEM photographs shown in FIG. 11 were photographed at a magnification of 50. In the image analysis, commercially available image analysis software such as trade name: Paint Shop ProX manufactured by COREL Co. may be used. The magnification of the SEM photograph may be such a magnification as to obtain a clear image, and an arbitrary magnification may be selected from 10 to 1000.

As described above, the gaps 8 have a size in excess of a size preferably five times, further preferably ten times the average value (the image maximum distance average) of the inner diameters of the pores 5. When the size is five times or less the average value, in the cell having a plugged outlet, an amount of gas to reach the vicinity of an outlet end decreases, and an effective use ratio of a catalyst in the partition wall lowers in the vicinity, and therefore a purification efficiency sometimes becomes insufficient.

According to such a constitution, the effective use ratio of the cell in the vicinity of the outlet end can be increased to maintain a high purification efficiency.

Figure 12:
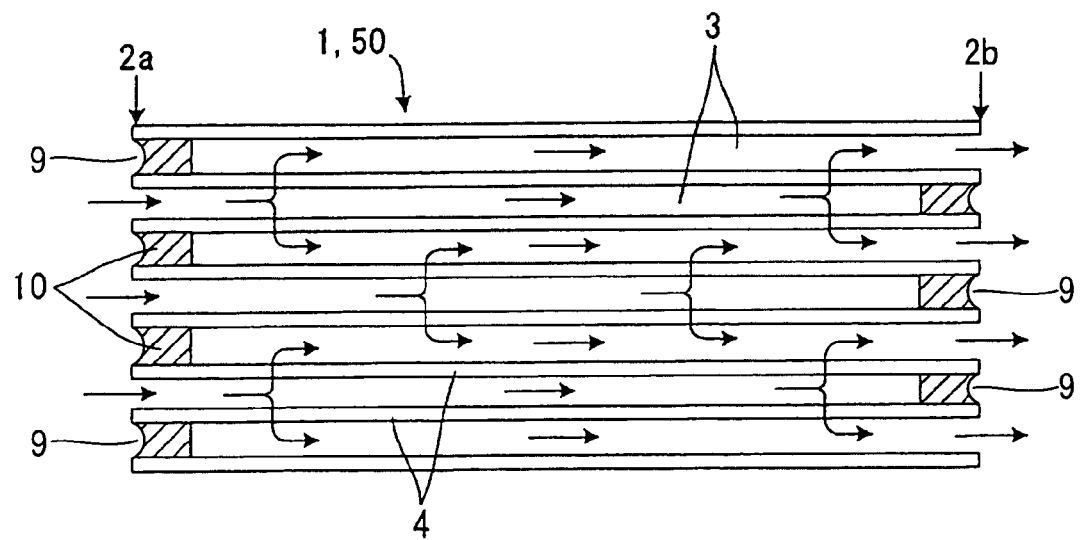
FIG. 12 shows inwardly recessed dents in plugging portions.

Moreover, it is preferable that tips of the plugging portions 20 in the two end faces 2a, 2b have inwardly recessed dents 9. See FIG. 12. According to such a constitution, a stress due to a difference in Young's modulus or coefficient of thermal expansion between a plugging material (a plugging member) and a partition wall material can be relaxed, and falling of the plugging member can be suppressed.

Furthermore, a standard deviation of a distribution (a pore diameter distribution) of the inner diameters of the pores of the partition walls 4 is preferably 6% or more, further preferably 10% or more of a value of the image maximum distance average. In a case where the deviation is less than 6%, a ratio of the pore diameters smaller than the image maximum distance average which can earn a surface area ratio lowers, the effective surface areas reduces, and a purification performance sometimes deteriorates.

According to such a constitution, a large effective surface area can be maintained, and eventually a high purification performance can be maintained.

As shown in FIGS. 6(a) to (d), in the present embodiment, a ratio of the cells 3 having a cell deformation degree (a difference (W−d) between a width (W) of the cell and the maximum dimension (d) of a predetermined cell gauge passable through the cell) of 0.05 mm or more among the plurality of cells 3 is preferably 10% or more, further preferably 20% or more. When the ratio is less than 10%, a relaxing effect of the thermal stress due to cell deformation lowers, and the cell sometimes easily breaks owing to a rapid temperature change.

Moreover, a ten-point average surface roughness of the inner surfaces of the pores of the partition walls 4 is preferably 5 µm or more, further preferably 20 µm or more. When the roughness is less than 5 µm a physical bond strength between a wash coat and the pore surface lowers, and the wash coat sometimes easily drops down owing to repeated vibrations and heat.

According to such a constitution, strong wash coat coating can be achieved so that the wash coat does not easily drops down even in a case where the vibrations and a temperature fluctuation are repeated.

Furthermore, it is preferable that a distribution density of the plurality of cells 3 per unit volume is in a range of 7 to 65 cells/cm$^2$, the partition walls 4 have a thickness of 0.3 to 1 mm, the image maximum distance average is in a range of 50 to 500 µm, and a porosity is in a range of 40 to 65%. It is further preferable that the distribution density of the plurality of cells 3 per unit volume is in a range of 12 to 35 cells/cm$^2$, the partition walls 4 have a thickness of 0.3 to 0.5 mm, the image maximum distance average is in a range of 60 to 100 µm, and the porosity is in a range of 60 to 65%. When the distribution density of the plurality of cells 3 per unit volume is less than 7 cells/cm$^2$, a GSA runs short, and a purification performance sometimes deteriorates. When the distribution density exceeds 65 cells/cm$^2$, a pressure loss increases, and an engine output sometimes lowers. When the thickness of the partition wall 4 is less than 0.3, the pore surface area is reduced, the GSA runs short, and the purification performance sometimes deteriorates. When the thickness exceeds 1 mm, the pressure loss increases, and the engine output sometimes lowers. When the image maximum distance average is less than 50 µm, particulate matter in an exhaust gas is trapped, and the pores are sometimes clogged. When the average exceeds 500 µmL, the GSA runs short, and the purification performance sometimes deteriorates. When the porosity is less than 40%, a partition wall passing flow rate increases, and the purification performance sometimes deteriorates. When the porosity exceeds 65%, strength sometimes becomes insufficient.

It is to be noted that the "porosity" means a physical value measured by image analysis. Specifically, SEM photographs of at least five visions of a partition wall section are observed, each vision having a size of vertical×lateral=t×t, in which "t" is a partition wall thickness. In each of the observed visions, a void area ratio is obtained, followed by raising the ratio to the 3/2 power. The thus obtained values of all the visions are averaged, and the resultant average is referred to as the "porosity".

According to such a constitution, the purification performance is high, the pressure loss is in an allowable range, and the engine output does not lower. Moreover, the cells are not clogged with the particulate matters in the exhaust gas, and a long-term performance can be maintained.

Furthermore, the partition walls 4 have a permeability of preferably $7 \times 10^{-12}$ to $4 \times 10^{-8}$ m$^2$, further preferably $9 \times 10^{-12}$ to $2 \times 10^{-10}$ m$^2$. When the permeability is less than $7 \times 10^{-12}$ m$^2$, the partition wall passage pressure loss sometimes becomes excessively large. When the permeability exceeds $4 \times 10^{-8}$ m$^2$, partition wall passing gas flow rates at positions of a carrier become non-uniform, an effective use ratio of the GSA lowers, and the purification performance sometimes deteriorates.

It is to be noted that the "permeability" is a physical value calculated from the following equation (1) and is an index value indicating a passage resistance when a predetermined gas passes through an object (the partition wall). Here, in the following equation (1), C is a permeability (m$^2$), F is a gas flow rate (cm$^3$/s), T is a sample thickness (cm), V is a gas viscosity (dynes·sec/cm$^2$), D is a sample diameter (cm), and P is a gas pressure (PSI). Moreover, numeric values in the following equation (1 are 13.839 (PSI)=1 (atm), and 68947.6 (dynes·sec/cm$^2$)=1 (PSI). It is to be noted that during measurement, for example, a device having trade name "Capillary Flow pormeter" (manufactured by Porous Materials, Inc., model: 1100 AEX) or the like was used.

[Equation 1]

$$C = 8FTV \times 10^{-4} / \{\pi D^2 (P - 13.839^2)/13.839 \times 68947.6\} \quad (1)$$

According to such a constitution, the partition wall passing gas flow rates at the respective positions in the carrier can be uniformed, the effective use ratio of the GSA can be increased, and a high purification performance can be maintained. Moreover, the pressure loss can be controlled into an allowable range.

As a material constituting the honeycomb structure 1 according to the present embodiment, a material containing a ceramic as the main component, a sintered metal and the like are preferable examples. Specifically, when the material contains the ceramic as the main component, preferable examples of the ceramic include silicon carbide, cordierite, alumina titanate, sialon, mullite, silicon nitride, zirconium phosphate, zirconia, titania, alumina, silica and a combination thereof. In particular, ceramics such as silicon carbide, cordierite, mullite, silicon nitride and alumina are preferable in view of an alkali resistance. Above all, an oxide-based ceramic is preferable from a viewpoint of costs.

In the honeycomb structure 1 of the present embodiment, the coefficient of thermal expansion in a cell-connecting direction at 40 to 800° C. is preferably less than $1.0 \times 10^{-6}$/° C., further preferably less than $0.8 \times 10^{-6}$/° C., especially preferably less than $0.5 \times 10^{-6}$/° C. When the coefficient is less than $1.0 \times 10^{-6}$/° C., a thermal stress generated during exposure to high-temperature exhaust gas can be reduced into an allowable range, and collapse of the honeycomb structure due to the thermal stress can be suppressed.

Moreover, a shape of a section cut along a plane perpendicular to the cell-connecting direction of the honeycomb structure 1 of the present embodiment is preferably a shape suitable for an inner shape of an exhaust system to be installed. Specific examples of the shape include a circle, an ellipse, an oblong, a trapezoid, a triangle, a quadrangle, a hexagon and a horizontally asymmetric irregular shape. Above all, a circle, an ellipse and an oblong are preferable.

The honeycomb structure of the present invention can be manufactured in conformity to, for example, a conventionally known manufacturing method of a diesel particulate filter (DPF). Therefore, for example, a chemical composition of materials is appropriately adjusted, or particle diameters of the raw material are appropriately selected. Furthermore, when a porous structure is constituted using a pore former, a type, particle diameters of the pore former for use, an amount of the pore former to be added, and the like, are appropriately adjusted, whereby the porosity and the pore diameters can be adjusted into predetermined numeric value ranges.

Figure 3:
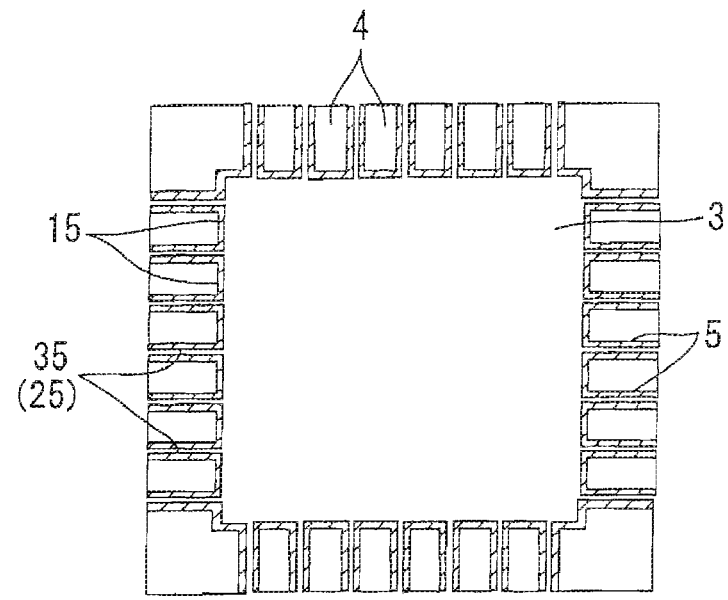
FIG. 3 is a partially enlarged view schematically showing one embodiment of a honeycomb catalyst of the present invention.

Next, one embodiment of a honeycomb catalyst of the present invention will be described. As shown in FIGS. 1 to 3, a honeycomb catalyst 50 of the present embodiment has a constitution in which a catalyst is carried on the above-mentioned honeycomb structure 1. FIG. 3 shows the honeycomb catalyst provided with the honeycomb structure 1 and catalyst-containing catalyst layers 5. The catalyst layers 5 are carried on inner surfaces of pores 25 in the form of a layer, and a large number of catalyst-carrying pores 35 are formed in the partition walls 4. It is to be noted that the catalyst-carrying pores 35 connect adjacent cells 3 to each other. Catalyst layers 15 may be formed on inner surfaces of the cells 3 excluding the catalyst-carrying pores 35.

With regard to the partition walls 4 of the honeycomb structure 1, as described above, in the honeycomb catalyst 50 of the present embodiment in which the catalyst layers 5 are carried on the inner surfaces of the pores 25 of the honeycomb structure 1, carbon particulate matter and the like contained in an exhaust gas discharged from a diesel engine are not easily trapped by the partition walls 4, and most of them pass through the partition walls. That is, as shown in FIG. 2, the exhaust gas which has entered the cell 3 of the honeycomb catalyst 50 from one end face 2a passes through the partition wall 4 to move to the adjacent cells 3 and then flows externally from the other end face 2b. Therefore, the honeycomb catalyst 53 of the present embodiment has only small pressure loss. Even when the catalyst is used for a long period, the pressure loss does not easily increase.

Moreover, in the honeycomb catalyst 50 of the present embodiment, unlike a conventional honeycomb catalyst in which the catalyst layers 5 are carried on the inner surfaces of the cells 3, the catalyst layers 5 are carried also on the inner surfaces of the pores 25 of the cells 3 (the partition walls 4). Therefore, with increase of a surface area, contact chances between as and the carrier increase. Therefore, the honeycomb catalyst of the present embodiment is a compact catalyst having a more excellent purification efficiency and mountable even in a limited space as compared with the conventional honeycomb catalyst.

The porosity of the partition wall 4 in a state in which the catalyst layer 5 is carried, that is, the catalyst-carrying pores 35 are formed is preferably 30 to 80% further preferably 40 to 65%. When the porosity is less than 30%, a partition wall passing flow rate increases, and a purification performance sometimes deteriorates. When the porosity exceeds 80%, strength sometimes becomes insufficient.

Specific examples of the catalyst contained in the catalyst layer 5 constituting the honeycomb catalyst 50 of the present embodiment include (1) a gasoline engine exhaust gas-purifying ternary catalyst, (2) a gasoline or diesel engine exhaust gas-purifying oxide catalyst, (3) an SCR catalyst for $NO_x$ selective reduction, and (4) an $NO_x$ adsorber catalyst.

The gasoline engine exhaust gas-purifying ternary catalyst includes a carrier coat which covers the partition walls of the honeycomb structure (a honeycomb carrier) and a noble metal dispersed and carried in this carrier coat. The carrier coat is made of, for example, active alumina. Preferable examples of the noble metal to be dispersed and carried in the carrier coat include Pt, Rh, Pd, and a combination thereof. The carrier coat further contains a compound such as cerium oxide, zirconia oxide or silica, or a mixture obtained by combining them. It is to be noted that a total amount of the noble metal is preferably 0.17 to 7.07 g per liter of the honeycomb structure.

The oxide catalyst for the purification of the gasoline or diesel engine exhaust gas contains a noble metal. As this noble metal, one or more selected from the group consisting of Pt, Rh and Pd is preferable. It is to be noted that a total amount of the noble metal is preferably 0.17 to 7.07 g per liter of the honeycomb structure. The SCR catalyst for $NO_x$ selective reduction contains at least one selected from the group consisting of metal-substituted zeolite, vanadium, titania, tungsten oxide, silver and alumina.

The $NO_x$ adsorber catalyst contains an alkali metal and/or an alkali earth metal. Examples of the alkali metal include K, Na and Li. Examples of the alkali earth met-al include Ca and Ba. It is to be noted that the total amount of K, Na, Li and Ca is preferably 5 g or more per liter or the honeycomb structure.

The honeycomb catalyst of the present invention can be manufactured by carrying the catalyst on the above-mentioned honeycomb structure by a manufacturing method in conformity to a conventionally known method. Specifically, first a carrier-containing catalyst slurry is prepared. Subsequently, the surfaces of the pores of the partition walls of the honeycomb structure are coated with this catalyst slurry by a method such as a suction process.

Afterward, the structure is dried on conditions of room temperature or under heating, whereby the honeycomb catalyst of the present invention can be manufactured.

EXAMPLES

The present invention will hereinafter specifically be described based on examples, but the present invention is not limited to these examples. It is to be noted that in the present example, pore diameters, a porosity, a purification index number, a safety temperature difference against a thermal shock, a percentage of plugging portions having gaps, a plugging portion dent depth average, the number of abnormal plugging portions during repetition of a long-period thermal cycle, a cell deformation degree average, and a percentage of the number of cells having a cell deformation degree of 0.05 mm or more were measured as follows.

[Pore Diameter]: Pore diameters were measured by image analysis, and an image maximum distance average and a standard deviation of a pore diameter distribution (a pore diameter distribution σ) were calculated. Specifically, SEM photographs of at least 20 visions of a partition wall section were observed, each vision having a size of vertical× lateral=t×t, in which "t" is a partition wall thickness. Subsequently, a maximum linear distance in a void of each observed vision was measured, and an average value of the maximum linear distances measured with respect to all the visions was defined as an "image maximum distance average". A magnification of the SEM photograph was set to 50.

[Porosity]: The porosity was measured by image analysis. Specifically, SEM photographs of at least five vision of a partition wall section were observed, each vision having a size of vertical×lateral=t×t, in which "t" is a partition wall thickness. In each of the observed visions, a void area percentage was obtained, followed by raising the ratio to the 3/2 power. The thus obtained values of all the visions were averaged, and the resultant average is referred to as the "porosity".

[Purification index number]: A combustion gas containing 7 vol % of oxygen, 10 vol % of a water vapor, 10 vol % of carbon dioxide, 200 (carbon molar number, ppm of hydrocarbon, and a remaining part of nitrogen was allowed to flow into a honeycomb structure or a honeycomb catalyst on conditions that the space velocity (SV) was 100000 $h^{-1}$ and the temperature was 200° C. A purification ratio (%) was calculated from a concentration of hydrocarbon of the combustion gas before and after the inflow. A purification ratio (a reference purification ratio (%)) was calculated using a comparative honeycomb catalyst, and a purification index number (%) was calculated as a ratio with respect to this reference purification ratio. Here, a purification index number=200% means a purification ratio twice that of the comparative honeycomb catalyst. It is to be noted that a honeycomb catalyst presumed for application to an automobile was compared with a simple catalyst-carrying honeycomb structure (without any plugging portion) having a cell density of 600 cpsi (93 cells/cm$^2$) and a partition wall thickness of 4.5 mil (0.1143 mm). Moreover, a honeycomb catalyst presumed for industrial application was compared with a simple catalyst-carrying honeycomb structure (without any plugging portion) having a cell density of 30 cpsi (4.65 cells/cm$^2$) and a partition wall thickness of 32 mil (0.8128 mm).

[Safety Temperature Difference Against Thermal Shock]

A test was carried out by subjecting a carrier to a repeated thermal shock test by a method for alternately supplying, to the carrier, a combustion gas formed by a propane gas burner and ordinary-temperature air, to check whether or not cracks were generated after the test. Heating conditions were set to a gas flow rate of 1.0 Nm$^3$/min for ten minutes, and cooling conditions were set to a gas flow rate of 0.5 Nm$^3$/min for ten minutes. Afterward, a temperature of the center of the carrier was measured with a sheath thermocouple having a diameter of 0.5 mm, and a maximum value of differences between a maximum temperature and a minimum temperature in such a range that any crack was not generated was defined as the safety temperature difference against the thermal shock.

[Percentage of Plugging Port-Ions Having Gaps]

A ratio of the number of plugging portions having through gaps or through pores having a size in excess of a size five times an average maximum diameter of a plugging portion material to the number of all the plugging portions including inlet and outlet ends was defined as the percentage of the plugging portions having the gaps, and the ratio was measured by a method of microscope observation.

[Plugging Portion Dent Depth Average]

Plugging portion dents were measured by shape measurement with a plugging portion surface roughness meter. The average depth of dents of 30 randomly selected plugging portions was defined as the plugging portion dent depth average.

[The Number of Abnormal Plugging Portions During Repetition of Long-period Thermal Cycle]

200 cycles of a repeated thermal cycle test were performed using a propane gas burner on heating conditions (a gas flow rate of 1.0 Nm³/min, a gas temperature: 90° C., 10 minutes) and cooling conditions (a ordinary-temperature air flow rate of 0.5 Nm³/min, 10 minutes), and then a push-out load test of the plugging portions was performed to regard, as abnormal plugging portion, plugging portions having an initial average push-out load below 30%. Then, the number of the abnormal plugging portions among randomly selected 30 plugging portions was defined as the number of the abnormal plugging portions.

[Cell Deformation Degree Average]

Cell deformation degrees of 30 opening cells were measured based on the above-mentioned definition, and the average value of the degrees was defined as the cell deformation degree average.

[Percentage of the Number of Cells Having a Cell Deformation Degree of 0.05 mm or More]

Cell deformation degrees of 30 randomly selected opening cells were measured as described above, and a ratio of the number of the cells having a deformation degree of 0.05 mm or more was defined as a percentage of the number of the cells having a deformation degree of 0.05 mm or more.

Examples 1 and 2

A plurality of components selected from the group consisting of talc, kaolin, calcined kaolin, alumina, calcium hydroxide and silica were combined to prepare a cordierite forming material at a predetermined ratio so that a chemical composition of the material included 42 to 56 mass % of $SiO_2$, 0 to 45 mass % of $Al_2O_3$ and 12 to 16 mass % of $MgO$. To 100 parts by mass of the cordierite forming material, 12 to 25 parts by mass of graphite as a pore former and 5 to 15 parts by mass of synthetic resin were added. Then, appropriate amounts of methyl celluloses and a surfactant were added thereto, respectively, and water was added and kneaded to prepare clay. The prepared clay was evacuated and extruded to obtain a honeycomb formed body. The resultant honeycomb formed body was dried and fired in a range of a maximum temperature of 1400 to 1430° C. to obtain a honeycomb fired body. One end of each cell of the resultant honeycomb fired body was filled with a plugging agent so as to obtain a checkered pattern, and the body was again fired to prepare a honeycomb structure (preparation Nos. 1 and 2) having a partition wall pore structure, a diameter of 100 mm and a total length of 100 mm (the resultant honeycomb structures are originally examples of the present invention and hence can be shown with example numbers, but the honeycomb structures are shown with the preparation numbers for the sake of convenience, and honeycomb catalysts finally formed using these honeycomb structures are shown with the example numbers). It is to be noted that a chemical composition of the cordierite forming material, particle diameters of the pore former, an amount of the pore former to be added and the like were appropriately adjusted to prepare the partition wall pore structure. A plugging depth of a plugging portion was set to 10 mm from an end face (in the preparation number of the honeycomb structure provided with the plugging portions, "symbol X" is attached to the preparation number of the structure before the plugging portions are formed thereon. For example, honeycomb structures 1, 2 provided with the plugging portions are shown as honeycomb structures 1X and 2X).

Subsequently, catalyst slurry containing platinum (Pt) as a noble metal and further containing active alumina, and ceria as an oxygen adsorber agent was prepared. By a suction process, coat layers of the prepared catalyst slurry were formed on partition wall inner surfaces and pore inner surfaces of the honeycomb structures of the preparation numbers 1X and 2X obtained as described above. Subsequently, the structures were heated and dried to prepare honeycomb catalysts having partition wall (provided with catalyst layers) pore structures. It is to be noted that an amount of a noble metal (Pt) per liter of the honeycomb structure (a carrier) was set to 2 g. A coat amount of the catalyst slurry per liter of the honeycomb structure (a carrier, was set to 100 g.

The preparation number, a diameter×a length, a cell density (cpsi), a cell density (1/cm²), a partition wall thickness (mil), a partition wall thickness (mm), an mage maximum distance average, a porosity, a GSA and a purification ratio index number of each of the honeycomb structures used in the honeycomb catalysts prepared in Examples 1 and 2 are shown in Table 1, respectively.

Example 3

This example was prepared in the same manner as in Example 1 except that a ceramic foam was used as a honeycomb structure instead of the honeycomb structure 1X of Example 1. That is, a cordierite material similar to that of Example 1 was used, and water was added thereto and mixed therewith in the form of slurry, followed by impregnating a sponge-like organic polymer material as a pore forming agent with the slurry. Afterward, the material was dried and fired to burn away the pore forming-agent, and a fired body was obtained. Then, pores were processed in both ends of the fired body, and a honeycomb structure having a structure similar to that of Example 1 and different cell density and rib thickness was prepared, followed by preparing a honeycomb catalyst by the use of this honeycomb structure in the same manner as in Example 1. A diameter×a length, an image maximum distance average, a porosity, a GSA and a purification index number of the ceramic foam used in the honeycomb catalyst prepared in Example 3 are shown in Table 1, respectively.

Comparative Examples 1, 2, 19, 20

In Comparative Example 1, a honeycomb catalyst was prepared in the same manner as in Example 1 except that a honeycomb structure 1 which was not provided with any plugging portion was used instead of the honeycomb structure 1X of Example 1 provided with the plugging portions and that any catalyst was not carried in pores and was carried only on the surfaces of partition walls. In Comparative Example 2, a honeycomb catalyst was prepared in the same manner as in Example 2 except that a honeycomb structure 2 which was not provided with any plugging portion was used instead of the honeycomb structure 2X of Example 2 provided with the plugging portions and that any catalyst was not carried in pores and was carried only on the surfaces of partition walls. In Comparative Example 19, a honeycomb catalyst was prepared in the same manner as in Example 1 except that the image maximum distance average was reduced and a GAS was increased in Example 1. In Comparative Example 20, a honeycomb catalyst was prepared in the same manner as in Example 2 except that an image maximum distance average was reduced and that the GAS was increased comparison with in Example 2. The preparation number, a diameter×a length, a cell density (cpsi), a cell density (1/cm²), a partition wall thickness (mil), a partition wall thickness (mm), an image maximum distance average, a porosity, a GSA and a purification index number of each of the honeycomb structures used in the honeycomb catalysts prepared in Comparative Examples 1, 2, 19 and 20 are shown in Table 1, respectively.

A preparation number, a diameter×a length, a cell density (cpsi), a cell density (1/cm$^2$), a partition wall thickness (mil), a partition wall thickness (mm), an image maximum distance average, a porosity, a GSA, an inner cut length, the number of

TABLE 1

| | Honeycomb structure | Diameter × length (mm) | Cell density (cpsi) | Cell density (1/cm$^2$) | Partition wall thickness (mil) | Partition wall thickness (mm) | Image maximum distance average (mm) | Porosity (%) | GSA (cm$^2$/cm$^3$) | Purification index number |
|---|---|---|---|---|---|---|---|---|---|---|
| Comp. Exam. 1 | 1 | 100 × 100 | 100 | 15.5 | 30 | 0.76 | — | — | 44.4 | 1.2 |
| Comp. Exam. 2 | 2 | 100 × 100 | 50 | 7.75 | 50 | 1.27 | — | — | 29 | 1 |
| Exam. 1 | 1X | 100 × 100 | 100 | 15.5 | 30 | 0.76 | 0.08 | 50 | 106.4 | 1.9 |
| Exam. 2 | 2X | 100 × 100 | 50 | 7.75 | 50 | 1.27 | 0.08 | 50 | 114.3 | 1.8 |
| Exam. 3 | Ceramic foam | 100 × 30 | 5 | 0.78 | 300 | 12.7 | 0.3 | 70 | 111 | 1.6 |
| Comp. Exam. 19 | 1X | 100 × 100 | 100 | 15.5 | 30 | 0.76 | 0.04 | 50 | 400 | 0.9 |
| Comp. Exam. 20 | 2X | 100 × 100 | 50 | 7.75 | 50 | 1.27 | 0.03 | 50 | 550 | 0.8 |

Examples 4 to 9

In Example 4, a honeycomb catalyst was prepared in the same manner as in Example 1 except that the honeycomb structure 1X of Example 1 provided with an inner cut was used as a honeycomb structure. In Example 6, a honeycomb catalyst was prepared in the same manner as in Example 1 except that the honeycomb structure 1X of Example 1 provided with a rib cut was used as a honeycomb structure. In Example 8, a honeycomb catalyst was prepared in the same manner as in Example 1 except that the honeycomb structure 1X of Example 1 provided with a rib cut was used as a honeycomb structure. In Example 5, a honeycomb catalyst was prepared in the same manner as in Example 2 except that the honeycomb structure 2X of Example 2 provided with an inner cut was used as a honeycomb structure. In Example 7, a honeycomb catalyst was prepared in the same manner as in Example 2 except that the honeycomb structure 2X of Example 2 provided with an inner cut and a rib cut was used as a honeycomb structure. In Example 9, a honeycomb catalyst was prepared in the same manner as in Example 2 except that the honeycomb structure 2X of Example 2 provided with a rib cut was used as a honeycomb structure.

the rib cuts, and a safety temperature difference against thermal shock of each of the honeycomb structures used for the honeycomb catalysts prepared in Examples 4 to 9 are shown in Table 2, respectively.

Comparative Examples 3 and 4

In Comparative Example 3, a honeycomb catalyst was prepared in the same manner as in Example 4 except that the honeycomb structure 1X of Example 4 which was provided with neither an inner cut nor a rib cut was used. In Comparative Example 4, a honeycomb catalyst was prepared in the same manner as in Example 5 except that the honeycomb structure 2X of Example 5 which was provided with neither an inner cut nor a rib cut was used. A preparation number, a diameter×a length, a cell density (cpsi) a cell density (1/cm$^2$), a partition wall thickness (mil), a partition wall thickness (mm), an image maximum distance average, a porosity, a GSA, an inner cut length, the number of the rib cuts, and a safety temperature difference against a thermal shock of each of the honeycomb structures used for the honeycomb catalysts prepared in Comparative Examples 3 and 4 are shown in Table 2, respectively.

TABLE 2

| | Honeycomb structure | Diameter × length (mm) | Cell density (cpsi) | Cell density (1/cm$^2$) | Partition wall thickness (mil) | Partition wall thickness (mm) | Image maximum distance average (mm) | Porosity (%) | GSA (cm$^2$/cm$^3$) | Inner cut length (mm) | Number of rib cuts (cuts/cm$^2$) | Thermal shock safety temperature difference (° C.) |
|---|---|---|---|---|---|---|---|---|---|---|---|---|
| Comp. Exam. 3 | 1X | 100 × 100 | 100 | 15.5 | 30 | 0.76 | 0.08 | 50 | 106.4 | 0 | 0 | 650 |
| Comp. Exam. 4 | 2X | 100 × 100 | 50 | 7.75 | 50 | 1.27 | 0.08 | 50 | 114.3 | 0 | 0 | 650 |
| Exam. 4 | 1X | 100 × 100 | 100 | 15.5 | 30 | 0.76 | 0.08 | 50 | 106.4 | 30 | 0 | 750 |
| Exam. 5 | 2X | 100 × 100 | 50 | 7.75 | 50 | 1.27 | 0.08 | 50 | 114.3 | 100 | 0 | 800 |
| Exam. 6 | 1X | 100 × 100 | 100 | 15.5 | 30 | 0.76 | 0.08 | 50 | 106.4 | 50 | 2 | 820 |
| Exam. 7 | 2X | 100 × 100 | 50 | 7.75 | 50 | 1.27 | 0.08 | 50 | 114.3 | 0 | 1 | 750 |
| Exam. 8 | 1X | 100 × 100 | 100 | 15.5 | 30 | 0.76 | 0.08 | 50 | 106.4 | 0 | 0.5 | 750 |
| Exam. 9 | 2X | 100 × 100 | 50 | 7.75 | 50 | 1.27 | 0.08 | 50 | 114.3 | 0 | 6 | 750 |

Examples 10 to 15

In Examples 10, 12 and 14, honeycomb catalysts were prepared in the same manner as in Example 1 except that as a honeycomb structure, the honeycomb structure 1X was used which was provided with plugging portions 20 including gaps extending through the plugging portions and having a size extending through plugging portions in excess of a size five times an average value (an image maximum distance average, of inner diameters of pores 25; or which was provided with the plugging portions 20 including pores or cracks extending through the plugging portions 20 and having a vertical, lateral or width dimension in excess of size five times the image maximum distance average of a material for the plugging portions 20 in a case where the plugging portions were observed from a direction perpendicular to end faces 2a, 2b; or which was provided with plugging portions 20 having gaps between the plugging portions and partition walls 4. Ratios (ratios of the plugging portions provided with the gaps) of the number or these plugging portions in the number of all the plugging portions was set to 5, 20 and 50%. In Examples 11, 13 and 15, honeycomb catalysts were prepared in the same manner as in Example 2 except that as a honeycomb structure, the honeycomb structure 1X of Example 2 was used which was provided with plugging portions 20 including gaps extending through the plugging portions and having a size extending through plugging portions in excess of a size five times an average value (an image maximum distance average) of inner diameters of pores 25; or which was provided with the plugging portion 20 including pores or cracks extending through the plugging portions 20 and having a vertical, lateral or width dimension in excess of a size five times the image maximum distance average of a material for the plugging portions 20 in a case where the plugging portions were observed from a direction perpendicular to end faces 2a, 2b; or which was provided with plugging portions 20 having gaps between the plugging portions and partition walls 4. Ratios (ratios of the plugging portions provided with the gaps) of the number of these plugging portions in the number of all the plugging portions was set to 10, 40 and 100%. A preparation number, a diameter×a length, a cell density (cpsi), a cell density (1/cm$^2$), a partition wall thickness (mil), a partition wall thickness (mm), an image maximum distance average, a porosity, a GSA, a ratio of the plugging portions provided with the gaps and a purification index number of each of the honeycomb structures used for the honeycomb catalysts prepared in Examples 10 to 15 are shown in Table 3, respectively.

Comparative Examples 5 and 6

In Comparative Example 5, a honeycomb catalyst was prepared in the same manner as in Example 10 except that gaps of plugging portions were completely removed from all the plugging portions of Example 10. In Comparative Example 6, a honeycomb catalyst was prepared in the same manner as in Example 11 except that gaps of plugging portions were completely removed from all the plugging portions of Example 11. A preparation number, a diameter×a length, a cell density (cpsi), a cell density (1/cm$^2$), a partition wall thickness (mil), a partition wall thickness (mm), an image maximum distance average, a porosity, a GSA, a ratio of the plugging portions provided with the gaps and a purification index number of each of the honeycomb structures used for the honeycomb catalysts prepared in Comparative Examples 5 and 6 are shown in Table 3, respectively.

TABLE 3

| | Honeycomb structure | Diameter × length (mm) | Cell density (cpsi) | Cell density (1/cm$^2$) | Partition wall thickness (mil) | Partition wall thickness (mm) | Image maximum distance average (mm) | Porosity (%) | GSA (cm$^2$/cm$^3$) | Percentage of plugging portions provided with gaps (%) | Purification index number |
|---|---|---|---|---|---|---|---|---|---|---|---|
| Comp. Exam. 5 | 1X | 100 × 100 | 100 | 15.5 | 30 | 0.76 | 0.08 | 50 | 106.4 | 0 | 1.7 |
| Comp. Exam. 6 | 2X | 100 × 100 | 50 | 7.75 | 50 | 1.27 | 0.08 | 50 | 114.3 | 0 | 1.8 |
| Exam. 10 | 1X | 100 × 100 | 100 | 15.5 | 30 | 0.76 | 0.08 | 50 | 106.4 | 5 | 1.85 |
| Exam. 11 | 2X | 100 × 100 | 50 | 7.75 | 50 | 1.27 | 0.08 | 50 | 114.3 | 10 | 1.9 |
| Exam. 12 | 1X | 100 × 100 | 100 | 15.5 | 30 | 0.76 | 0.08 | 50 | 106.4 | 20 | 1.9 |
| Exam. 13 | 2X | 100 × 100 | 50 | 7.75 | 50 | 1.27 | 0.08 | 50 | 114.3 | 40 | 1.95 |
| Exam. 14 | 1X | 100 × 100 | 100 | 15.5 | 30 | 0.76 | 0.08 | 50 | 106.4 | 50 | 2 |
| Exam. 15 | 2X | 100 × 100 | 50 | 7.75 | 50 | 1.27 | 0.08 | 50 | 114.3 | 100 | 2.1 |

Examples 16 to 21

In Examples 16, 18 and 20, honeycomb catalysts were prepared in the same manner as in Example 1 except that honeycomb structures in which dents were formed so as to be recessed as deep as 0.5 mm, 1.6 mm and 3 mm inwardly in plugging portions were used as honeycomb structures. In Examples 17, 19 and 21, honeycomb catalysts were prepared in the same manner as in Example 2 except that honeycomb structures 2X in which dents were formed so as to be recessed as deep as 1.5 mm, 2 mm and 3.5 mm inwardly in plugging portions were used as honeycombs structures. A number, a diameter×a length, a cell density (cpsi), a cell density (1/cm$^2$), a partition wall thickness (mil), a partition wall thickness (mm), an image maximum distance average, a porosity, a GSA, a plugging portion dent average depth and the number (plugging abnormality number) of abnormal plugging portions during repetition of a long-period thermal cycle of each of honeycomb structures used in the honeycomb catalysts pre-cared in Examples 16 to 21 are shown in Table 4, respectively.

Comparative Examples 7 and 8

In Comparative Example 7, a honeycomb catalyst was prepared in the same manner as in Example 16 except that dents of plugging portions were removed from Example 16. In Comparative Example 8, a honeycomb catalyst was prepared in the same manner as in Example 17 except that dents of plugging portions were removed from Example 17. A number, a diameter×a length, a cell density (cpsi), a cell density (1/cm²), a partition wall thickness (mil), a partition wall thickness (mm), an image maximum distance average, a porosity, a GSA, a plugging portion dent average depth and the nuttier (plugging abnormality number) of abnormal plugging portions during repetition of a long-period thermal cycle of each of honeycomb structures used in the honeycomb catalysts prepared in Comparative Examples 7 and 8 are shown in Table 4, respectively.

GSA, the pore diameter distribution standard deviation, the standard deviation and a purification index number of each of the honeycomb structures used for the honeycomb catalysts prepared in Examples 22 to 27 are shown in Table 5, respectively.

Comparative Examples 9 and 10

In Comparative Example 9, a honeycomb catalyst was prepared in the same manner as in Example 22 except that

TABLE 4

| | Honeycomb structure | Diameter × length (mm) | Cell density (cpsi) | Cell density (1/cm²) | Partition wall thickness (mil) | Partition wall thickness (mm) | Image maximum distance average (mm) | Porosity (%) | GSA (cm²/cm³) | Plugging portion dent depth average (%) | Plugging abnormality number during repetition of long-period thermal cycle |
|---|---|---|---|---|---|---|---|---|---|---|---|
| Comp. Exam. 7 | 1X | 100 × 100 | 100 | 15.5 | 30 | 0.76 | 0.08 | 50 | 106.4 | −0.2 | 15 |
| Comp. Exam. 8 | 2X | 100 × 100 | 50 | 7.75 | 50 | 1.27 | 0.08 | 50 | 114.3 | −0.3 | 20 |
| Exam. 16 | 1X | 100 × 100 | 100 | 15.5 | 30 | 0.76 | 0.08 | 50 | 106.4 | 0.5 | 1 |
| Exam. 17 | 2X | 100 × 100 | 50 | 7.75 | 50 | 1.27 | 0.08 | 50 | 114.3 | 1.5 | 2 |
| Exam. 18 | 1X | 100 × 100 | 100 | 15.5 | 30 | 0.76 | 0.08 | 50 | 106.4 | 1.6 | 2 |
| Exam. 19 | 2X | 100 × 100 | 50 | 7.75 | 50 | 1.27 | 0.08 | 50 | 114.3 | 2 | 3 |
| Exam. 20 | 1X | 100 × 100 | 100 | 15.5 | 30 | 0.76 | 0.08 | 50 | 106.4 | 3 | 0 |
| Exam. 21 | 2X | 100 × 100 | 50 | 7.75 | 50 | 1.27 | 0.08 | 50 | 114.3 | 3.5 | 0 |

Examples 22 to 27

In Examples 22, 24 and 26, honeycomb catalysts were prepared in the same manner as in Example 1 except that as honeycomb structure, there were used honeycomb structures formed so that standard deviations of pore diameter distributions of partition walls constituting the honeycomb structure 1X of Example 1 were set to 7.5%, 12.5% and 12.5% of values of an image maximum distance average. In Examples 23, 25 and 27, honeycomb catalysts were prepared in the same manner as in Example 1 except that as honeycomb structures there were used honeycomb structures formed so that the standard deviations of pore diameter distributions of partition walls constituting the honeycomb structure 2X of Example 2 were set to 8.75%, 10% and 18.75% of values of an image maximum distance average. A number, a diameter×a length, a cell density (cpsi), a cell density (1/cm²), a partition wall thickness (mil), a partition wall thickness (mm), the image maximum distance average, a porosity, a Example 22 was changed so that the standard deviation of a pore diameter distribution of partition walls constituting the honeycomb structure 1X was 4.75 of a value of an image maximum distance average in Comparative Example 10, a honeycomb catalyst was prepared in the same manner as in Example 23 except that Example 23 was changed so that the standard deviation of a pore diameter distribution of partition walls constituting the honeycomb structure 2X was 4.875% of a value of an image maximum distance average. A number, a diameter×a length, a cell density (cpsi), a cell density (1/cm²), a partition wall thickness (mil), a partition wall thickness (mm), the image maximum distance average, a porosity, a GSA, the pore diameter distribution standard deviation, the standard deviation and a purification index number of each of the honeycomb structures used for the honeycomb catalysts prepared in Comparative Examples 9 and 10 are shown in Table 5, respectively.

TABLE 5

| | Honeycomb structure | Diameter × length (mm) | Cell density (cpsi) | Cell density (1/cm²) | Partition wall thickness (mil) | Partition wall thickness (mm) | Image maximum distance average (mm) | Porosity (%) | GSA (cm²/cm³) | Pore diameter distribution standard deviation (μm) | Standard deviation (%) | Purification index number |
|---|---|---|---|---|---|---|---|---|---|---|---|---|
| Comp. Exam. 9 | 1X | 100 × 100 | 100 | 15.5 | 30 | 0.76 | 0.08 | 50 | 106.4 | 3.8 | 4.75 | 1.7 |
| Comp. Exam. 10 | 2X | 100 × 100 | 50 | 7.75 | 50 | 1.27 | 0.08 | 50 | 114.3 | 3.9 | 4.875 | 1.8 |
| Exam. 22 | 1X | 100 × 100 | 100 | 15.5 | 30 | 0.76 | 0.08 | 50 | 106.4 | 6 | 7.5 | 2 |
| Exam. 23 | 2X | 100 × 100 | 50 | 7.75 | 50 | 1.27 | 0.08 | 50 | 114.3 | 7 | 8.75 | 2.1 |
| Exam. 24 | 1X | 100 × 100 | 100 | 15.5 | 30 | 0.76 | 0.08 | 50 | 106.4 | 10 | 12.5 | 2 |

TABLE 5-continued

| | Honeycomb structure | Diameter × length (mm) | Cell density (cpsi) | Cell density (1/cm²) | Partition wall thickness (mil) | Partition wall thickness (mm) | Image maximum distance average (mm) | Porosity (%) | GSA (cm²/cm³) | Pore diameter distribution standard deviation (μm) | Standard deviation (%) | Purification index number |
|---|---|---|---|---|---|---|---|---|---|---|---|---|
| Exam. 25 | 2X | 100 × 100 | 50 | 7.75 | 50 | 1.27 | 0.08 | 50 | 114.3 | 8 | 10 | 1.9 |
| Exam. 26 | 1X | 100 × 100 | 100 | 15.5 | 30 | 0.76 | 0.08 | 50 | 106.4 | 10 | 12.5 | 2 |
| Exam. 27 | 2X | 100 × 100 | 50 | 7.75 | 50 | 1.27 | 0.08 | 50 | 114.3 | 15 | 18.75 | 2 |

Examples 28 to 33

In Examples 28, 30 and 32, honeycomb catalysts were prepared in the same manner as in Example 1 except that in Example 1, as honeycomb structures, structures were used which were formed so that the percentages of cells having a cell deformation degree of the honeycomb structure 1X of 0.05 mm or more were 10%, 25% and 60%. In Examples 29, 31 and 33, honeycomb catalysts were prepared in the same manner as in Example 2 except that in Example 2, as honeycomb structures, structures were used which were formed so that the percentages of cells having a cell deformation degree of the honeycomb structure 2X of 0.05 mm or more were 30%, 40% and 80%. A number, a diameter×a length, a cell density (cpsi), a cell density (1/cm²), a partition wall thickness (mil), a partition wall thickness (mm), an image maximum distance average, a porosity, a GSA, a cell deformation degree average, a percentage of the number of cells having a cell deformation degree of 0.05 mm or more, and a safety temperature difference against a thermal shock of each of the honeycomb structures used for the honeycomb catalysts prepared in Examples 28 to 33 are shown in Table 6, respectively.

Comparative Examples 11 and 12

In Comparative Example 11, a honeycomb catalyst was prepared in the same manner as in Example 28 except that as a honeycomb structure, a structure was used which was formed so that the percentage of cells of honeycomb structure 1X having a cell deformation degree of 0.05 mm or more was 0%. In Comparative Example 12, a honeycomb catalyst was prepared in the same manner as in Example 29 except that as a honeycomb structure, a structure was used which was formed so that the percentage of cells of honeycomb, structure 2X having a cell deformation degree of 0.05 mm or more was 0%. A number, a diameter×a length, a cell density (cpsi), a cell density (1/cm²), a partition wall thickness (mil), a partition wall thickness (mm), an image maximum distance average, a porosity a GSA, a cell deformation degree average, a percentage of the number of cells having a cell deformation degree of 0.05 mm or more, and a safety temperature difference against a thermal shock of each of the honeycomb structures used for the honeycomb catalysts prepared in Comparative Examples 11 and 12 are shown in Table 6, respectively.

TABLE 6

| | Honeycomb structure | Diameter × length (mm) | Cell density (cpsi) | Cell density (1/cm²) | Partition wall thickness (mil) | Partition wall thickness (mm) | Image maximum distance average (mm) | Porosity (%) | GSA (cm²/cm³) | Cell deformation degree average (mm) | Percentage of number of cells having cell deformation degree of 0.05 mm or more (%) | Thermal shock safety temperature difference (° C.) |
|---|---|---|---|---|---|---|---|---|---|---|---|---|
| Comp. Exam. 11 | 1X | 100 × 100 | 100 | 15.5 | 30 | 0.76 | 0.08 | 50 | 106.4 | 0.02 | 0 | 650 |
| Comp. Exam. 12 | 2X | 100 × 100 | 50 | 7.75 | 50 | 1.27 | 0.08 | 50 | 114.3 | 0.03 | 0 | 650 |
| Exam. 28 | 1X | 100 × 100 | 100 | 15.5 | 30 | 0.76 | 0.08 | 50 | 106.4 | 0.06 | 10 | 720 |
| Exam. 29 | 2X | 100 × 100 | 50 | 7.75 | 50 | 1.27 | 0.08 | 50 | 114.3 | 0.08 | 30 | 780 |
| Exam. 30 | 1X | 100 × 100 | 100 | 15.5 | 30 | 0.76 | 0.08 | 50 | 106.4 | 0.13 | 25 | 800 |
| Exam. 31 | 2X | 100 × 100 | 50 | 7.75 | 50 | 1.27 | 0.08 | 50 | 114.3 | 0.16 | 40 | 750 |
| Exam. 32 | 1X | 100 × 100 | 100 | 15.5 | 30 | 0.76 | 0.08 | 50 | 106.4 | 0.11 | 60 | 800 |
| Exam. 33 | 2X | 100 × 100 | 50 | 7.75 | 50 | 1.27 | 0.08 | 50 | 114.3 | 0.15 | 80 | 750 |

Examples 34 to 38

In Examples 34 to 38, honeycomb catalysts were prepared in the same manner as in Example 1 except that in Example 1, as honeycomb structures, structures (a honeycomb structure preparation number 1X') were used which were formed so that distribution densities per unit volume of cells of the honeycomb structure 1X were 15.5 cells/cm², 31.00 cells/cm², 61.00 cells/cm², 7.55 cells/cm² and 46.5 cells/cm² and so that partition wall thicknesses were 0.76 mm, 0.254 mm, 0.254 mm, 1.27 mm and 0.3048 mm, respectively. A number, a diameter×a length, a cell density (cpsi), a cell density (1/cm²), a partition wall thickness (mil), a partition wall thickness (mm) and a purification index number of each of the honeycomb structures used for the honeycomb catalysts prepared in Examples 34 to 38 are shown in Table 7, respectively.

Comparative Examples 13 to 18

In Comparative Examples 13 to 18, honeycomb catalysts were prepared in the same manner as in Example 34 except that in Example 34, as honeycomb structures, structures (a honeycomb structure preparation number 1X') were used which were formed so that distribution densities per unit volume of cells of the honeycomb structure 1X were 1.55 cells/cm$^2$, 3.10 cells/cm$^{-2}$, 3.88 cells/cm$^2$, 77.50 cells/cm$^2$, 93.00) cells/cm$^2$ and 116.25 cells/cm$^2$ and so that partition wall thicknesses were 1.524=mm, 1.397 mm, 1.27 mm, 0.2794 mm, 0.1524 mm, and 0.127 mm respectively. A number, a diameter×a length, a cell density (cpsi), a cell density (1/cm$^2$), a partition wall thickness (mil), a partition wall thickness (mm) and a purification index number of each of the honeycomb structures used for the honeycomb catalysts prepared in Comparative Examples 13 to 18 are shown in Table 7, respectively.

TABLE 7

| | Honeycomb structure | Diameter × length (mm) | Cell density (cpsi) | Cell density (1/cm$^2$) | Partition wall thickness (mil) | Partition wall thickness (mm) | Purification index number |
|---|---|---|---|---|---|---|---|
| Example 34 | 1X' | 100 × 100 | 100 | 15.5 | 30 | 0.76 | 1.8 |
| Example 35 | 1X' | 100 × 100 | 50 | 7.75 | 50 | 1.27 | 1.7 |
| Example 36 | 1X' | 100 × 100 | 200 | 31.00 | 10 | 0.254 | 1.5 |
| Example 37 | 1X' | 100 × 100 | 300 | 46.50 | 12 | 0.3048 | 1.6 |
| Example 38 | 1X' | 100 × 100 | 400 | 62.00 | 10 | 0.254 | 1.7 |
| Comparative Example 13 | 1X' | 100 × 100 | 10 | 1.55 | 60 | 1.524 | 1.1 |
| Comparative Example 14 | 1X' | 100 × 100 | 20 | 3.10 | 55 | 1.397 | 1 |
| Comparative Example 15 | 1X' | 100 × 100 | 25 | 3.88 | 50 | 1.27 | 0.8 |
| Comparative Example 16 | 1X' | 100 × 100 | 500 | 77.50 | 11 | 0.2794 | 0.8 |
| Comparative Example 17 | 1X' | 100 × 100 | 600 | 93.00 | 6 | 0.1524 | 0.7 |
| Comparative Example 18 | 1X' | 100 × 100 | 750 | 116.25 | 5 | 0.127 | 0.7 |

INDUSTRIAL APPLICABILITY

A honeycomb structure and a honeycomb catalyst according to the present invention are preferably used in various industrial fields requiring purification of components to be purified contained in exhaust gas, for example, industrial fields such as an automobile industry, a mechanical industry and a ceramic industry requiring purification of exhaust gas from an internal combustion engine, a combustion apparatus and the like.

The invention claimed is:

1. A honeycomb structure for a catalyst carrier comprising: porous partition walls having a plurality of pores and arranged so as to form a plurality of cells which connect two end faces to each other; and plugging portions arranged so as to alternately plug one of the end portions of each of the cells in the two end faces,
wherein a geometrical surface area (GSA: a value ((S1+S2)/V) obtained by dividing a total of the whole inner surface area (S1) excluding the cell pores and the whole inner surface area (S2) of the pores by the whole volume (V) of the honeycomb structure) is 80 cm2/cm3 or more and less than 300 cm2/cm3, and
wherein a ratio of the cells having a cell deformation degree (a difference (W−d) between a width (W) of the cell and a maximum dimension (d) of a predetermined cell gauge passable through the cell) of 0.05 mm or more among the plurality of cells is 10% or more.

2. The honeycomb structure according to claim 1, wherein a part of the partition walls has a first missing portion (an inner cut) in the end faces and/or an inner part, and/or a part of the partition walls has a second missing portion (a rib cut) in the inner part.

3. The honeycomb structure according to claim 1, wherein the plugging portions have a size in excess of a size five times an average value (an image maximum distance average) of inner diameters of the pores and have gaps extending through the plugging portions.

4. The honeycomb structure according to claim 2, wherein the plugging portions have a size in excess of a size five times an average value (an image maximum distance average) of inner diameters of the pores and have gaps extending through the plugging portions.

5. The honeycomb structure according to claim 1, wherein tips of the plugging portions in the two end faces have inwardly recessed dents.

6. The honeycomb structure according to claim 2, wherein tips of the plugging portions in the two end faces have inwardly recessed dents.

7. The honeycomb structure according to claim 3, wherein tips of the plugging portions in the two end faces have inwardly recessed dents.

8. The honeycomb structure according to claim 4, wherein tips of the plugging portions in the two end faces have inwardly recessed dents.

9. The honeycomb structure according to claim 1, wherein a standard deviation of a distribution (a pore diameter distribution) of the inner diameters of the pores of the partition walls is 6% or more of a value of the image maximum distance average.

10. The honeycomb structure according to claim 2, wherein a standard deviation of a distribution (a pore diameter distribution) of the inner diameters of the pores of the partition walls is 6% or more of a value of the image maximum distance average.

11. The honeycomb structure according to claim 3, wherein a standard deviation of a distribution (a pore diameter distribution) of the inner diameters of the pores of the partition walls is 6% or more of a value of the image maximum distance average.

12. The honeycomb structure according to claim 4, wherein a standard deviation of a distribution (a pore diameter distribution) of the inner diameters of the pores of the partition walls is 6% or more of a value of the image maximum distance average.

13. The honeycomb structure according to claim 1, wherein a ten-point average surface roughness of the inner surfaces of the pores of the partition walls is 5 μm or more.

14. The honeycomb structure according to claim 2, wherein a ten-point average surface roughness of the inner surfaces of the pores of the partition walls is 5 μm or more.

15. The honeycomb structure according to claim 1, wherein a distribution density of the plurality of cells per unit volume is in a range of 7 to 65 cells/cm2, the partition walls have a thickness of 0.3 to 1 mm, the image maximum distance average is in a range of 50 to 500 μm, and a porosity is in a range of 40 to 65%.

16. The honeycomb structure according to claim 2, wherein a distribution density of the plurality of cells per unit volume is in a range of 7 to 65 cells/cm2, the partition walls have a thickness of 0.3 to 1 mm, the image maximum distance average is in a range of 50 to 500 μm, and a porosity is in a range of 40 to 65%.

17. The honeycomb structure according to claim 1, wherein the partition walls have a permeability of $7*10^{-12}$ to $4*10^{-8}$ m$^2$.

18. A honeycomb catalyst wherein a catalyst is carried on the honeycomb structure according to claim 1.

* * * * *